No. 878,347. PATENTED FEB. 4, 1908.
W. M. CLEMENT.
SHOEING HARNESS.
APPLICATION FILED JULY 8, 1907.
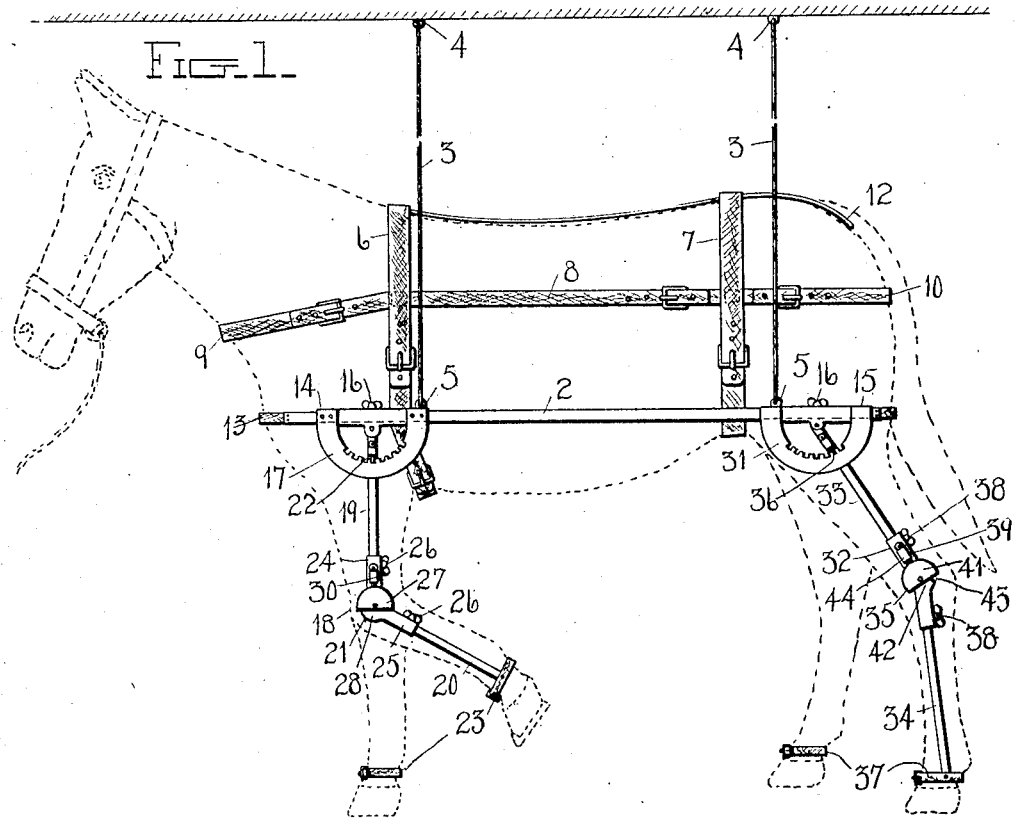
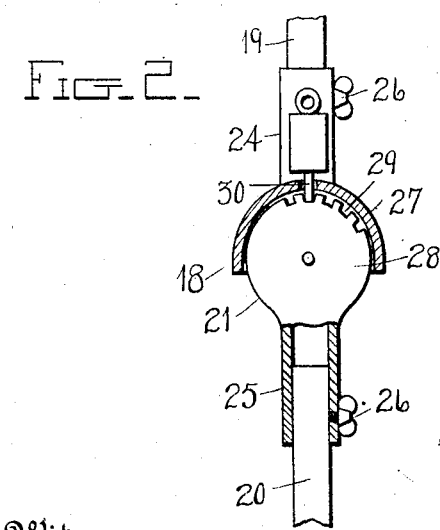
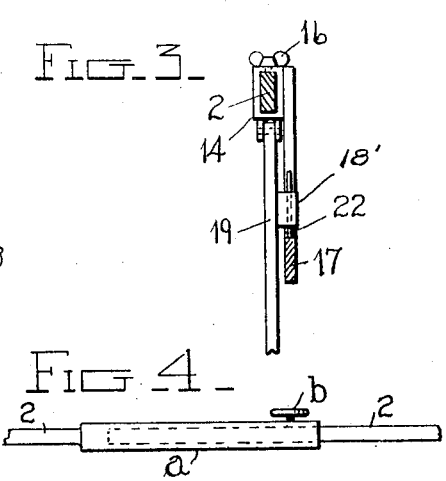
Witnesses
L. B. James
C. H. Griestauer
Inventor
W. M. CLEMENT
by H. B. Willson & Co
Attorneys

UNITED STATES PATENT OFFICE.

WALTER M. CLEMENT, OF AURORA, SOUTH DAKOTA.

SHOEING-HARNESS.

No. 878,347.  Specification of Letters Patent.  Patented Feb. 4, 1908.

Application filed July 8, 1907. Serial No. 382,765.

To all whom it may concern:

Be it known that I, WALTER MCHENRY CLEMENT, a citizen of the United States, residing at Aurora, in the county of Brookings and State of South Dakota, have invented certain new and useful Improvements in a Shoeing-Harness; and I do declare the following to be a full, clear, and exact description of the invention, such as will enable others skilled in the art to which it appertains to make and use the same.

This invention relates to improvements in shoeing harness.

The object of the invention is to provide a device of this character by means of which a horse may be firmly held during the operation of shoeing, means being provided for supporting the leg and foot in convenient position for applying a shoe thereto.

With this object in view, the invention consists of certain novel features of construction, combination and arrangement of parts as will be more fully described and particularly pointed out in the appended claims.

In the drawings, Figure 1 is a view of a horse, showing the application of the invention; Fig. 2 is an enlarged detailed sectional view of one of the leg braces; Fig. 3 is a detail vertical cross sectional view through one of the side bars and the adjustable connection for the upper end of a leg brace; and Fig. 4 is a detail side view of a portion of one of the side bars 2, showing a modified form of the same whereby the device may be lengthened or shortened.

Referring more particularly to the drawings, 1 denotes the harness, comprising side bars, 2, which are disposed in a horizontal position on each side of the horse along the lower portion of the body. The bars 2 are preferably supported by means of suspended rods 3, which are connected at their upper ends in rings or eyes 4, secured to the ceiling joist or a suitable overhead structure. The lower ends of the rods 3 are connected to eyes 5 on the bars 2, as shown.

The bars 2 are held in position by suitably arranged straps, which are here shown and preferably consist of a forward, back and belly-band, 6, which is passed around the body of the animal immediately in rear of the front legs, and of a rear back and belly-band, 7, which is passed around the body of the animal immediately in front of the hind legs. The bands 6 and 7 are provided with suitable buckles, whereby the same may be adjusted or fitted to the animal. The bands 6 and 7 are connected by longitudinally disposed side straps 8, said straps 8 being connected at their forward ends by a breast strap 9, and at their rear ends by a strap 10, which is passed around the hindquarters of the animal. To the band 7 is also connected a crupper 12, which is passed under the tail of the animal. To the front and rear ends of the bars 2 are also preferably connected front and rear fastening straps 13, which are provided with buckles and are adapted to be adjustably connected around the front and rear of the body of the horse, as shown.

On the forward end of each of the bars 2 are slidably and adjustably mounted sleeves, 14; while on the bars adjacent to their rear ends are slidably and adjustably mounted sleeves 15. The sleeves 14 and 15 are secured in their adjusted position on the bars 2 by means of set screws, 16. Connected to the front sleeves 14 are downwardly projecting segmental rack bars 17, and pivotally mounted on the sleeves 14, midway between the ends of the rack bar 17 and concentric thereof, are front leg braces 18, said braces preferably having an offset, as shown at 18', to provide for the engagement thereof with a rack bar, as shown in Fig. 3 of the drawing. The braces 18 are formed in upper, lower and intermediate adjustable sections, 19, 20 and 21. The upper section, 19, is provided with a pawl or bolt, 22, slidably engaging the offset 18' and is adapted to be engaged with the teeth of the segmental rack 17, whereby the front braces are adapted to be held in any desired angle. The lower sections 20 of the braces are connected at their lower ends to fastening straps 23, which are adapted to be buckled around the ankles of the animal immediately above the hoofs.

The intermediate sections 21 of the front braces consist of upper and lower pivotally connected or jointed members 24 and 25, the outer ends of said bars being tubular or hollow to receive the inner ends of the upper and lower sections of the braces, said ends being adjustably secured in the tubular ends of the members, 24 and 25, by means of set screws 26, whereby the length of the braces may be increased or decreased to adapt the same for use with horses of different sizes. The inner end of the upper member 24 of the intermediate section is provided with a segmental socket, 27, in which is pivotally and concentrically mounted a circular head, 28, formed on the upper end of the lower member 25 of the section 21. The head 28 is provided on its upper edge with a series of notches or recesses, 29, with one of which is adapted to be engaged a slidably mounted locking pawl 30. By providing the jointed connection between the upper and lower members of the intermediate section 21 of the braces, the lower portion of said braces may be turned or folded upwardly to support the front legs of the horse at any desired angle, thus providing for the fitting of a shoe without the necessity of manually raising and holding up the animal's hoof.

Connected to the rear sleeve 15 is a downwardly projecting segmental rack bar, 31, and pivotally mounted on said sleeve, midway between the ends of said rack bar and concentric thereto, is a rear leg brace, 32, which consists of upper and lower sections, 33 and 34, and an intermediate section 35. The upper section 33 is offset and provided with a locking pawl 36 to hold said brace in its adjusted position on the rack bar, 31. The lower end of the lower brace section 34 is provided with a fastening strap 37, adapted to be passed around the ankle of the hind leg of the horse, as shown. The intermediate section 35 is provided with tubular ends in which are adjustably secured the inner ends of the upper and lower sections 33 and 34, said ends being fastened in the tubular ends of the intermediate section by set screws, 38.

The intermediate sections 35 of the rear braces consist of upper and lower pivotally connected or jointed members 39 and 40, the upper member 39 being provided on its lower end with a segmental socket 41, in which is pivotally and concentrically mounted a circular head, 42, formed on the upper end of the lower member 40. The head 42 is provided on its upper edge with a series of notches 43, with one of which is adapted to be engaged a slidably mounted locking pawl 44, by means of which the upper and lower portions of the rear braces may be held at any desired angle for supporting the rear foot of the animal in a raised position. By connecting the leg braces with the adjustably mounted sleeves 14 and 15, said braces may be adjusted to fit horses of different sizes.

By providing a holding and leg supporting harness constructed and arranged as herein shown and described, the danger and trouble of shoeing unruly or fractious animals is entirely obviated, and the labor connected with the shoeing operation is materially decreased. The supporting rods 3 arranged as herein shown and described, prevent the animal from falling or being thrown while being operated on.

In Fig. 4 of the drawings is shown a modified construction of the side bars 2 in which the same are illustrated as being formed in two sections, the inner end of one section being provided with a tubular portion $a$ into which the inner end of the opposite section is inserted and held in adjustable position by a set-screw, $b$.

Having thus fully described my invention, what I claim as new, and desire to secure by Letters-Patent, is:

1. A shoe harness embracing supporting means, sleeves slidably arranged thereon, leg members pivotally mounted upon said sleeves and comprising upper and lower sections, an intermediate section, said intermediate section comprising upper and lower members having tubular outer ends to receive the inner ends of the upper and lower sections, set screws for adjustably securing said ends in place, a segmental socket formed in the lower end of the upper intermediate member, a circular head on the upper end of the lower member of said intermediate section, said circular head being pivotally mounted in said socket, a series of teeth formed on the outer edge of said head, means adapted to be engaged with said teeth for the retention of the sections of said members at any desired angle, and means connecting the lower end of the lower sections of the members with the ankle of the horse.

2. A shoeing harness comprising side bars adapted to be arranged on each side of the body of a horse, a series of straps to hold said bars in place, overhead supporting rods connected to the latter, sleeves adjustably mounted on said bars near their opposite ends, set screws to hold said sleeves in their adjusted position, leg braces pivotally mounted on said sleeves, said braces comprising upper and lower sections and an intermediate section, said intermediate section comprising upper and lower members having tubular outer ends to receive the inner ends of the upper and lower sections, set screws to adjustably secure said ends in place, a segmental socket formed on the lower end of the upper intermediate member, a circular head on the upper end of the lower member of said intermediate sections, said circular head being pivotally mounted in said socket, a series of teeth formed in the upper edge of said head, a pawl adapted to be engaged with said teeth to hold the sections of said members at any desired angle, and a strap to connect the lower end of the lower sections of the brace with the ankle of the horse, substantially as described.

In testimony whereof I have hereunto set my hand in presence of two subscribing witnesses.

W. M. CLEMENT.

Witnesses:
 WALLACE E. PURDY,
 W. G. CULHANE.